(12) United States Patent
Vavilala et al.

(10) Patent No.: US 11,607,910 B1
(45) Date of Patent: Mar. 21, 2023

(54) AXLE OSCILLATION STOP FOR CONSTRUCTION MACHINE

(71) Applicant: Caterpillar Inc., Peoria, IL (US)

(72) Inventors: Rajendra Vavilala, Montgomery, IL (US); Brian C. Howson, Bolingbrook, IL (US); William James Hurst, Arlington Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/653,002

(22) Filed: Mar. 1, 2022

(51) Int. Cl.
*B60B 35/00* (2006.01)
*E02F 9/02* (2006.01)
*B60G 9/02* (2006.01)

(52) U.S. Cl.
CPC .............. *B60B 35/007* (2013.01); *E02F 9/02* (2013.01); *B60G 9/02* (2013.01); *B60G 2200/322* (2013.01); *B60G 2204/45* (2013.01); *B60G 2300/09* (2013.01)

(58) Field of Classification Search
CPC ........... B60B 35/007; E02F 9/02; B60G 9/02; B60G 2200/322; B60G 2204/45; B60G 2300/09; B60G 2204/4502
See application file for complete search history.

(56) References Cited

U.S. PATENT DOCUMENTS

| | | | |
|---|---|---|---|
| 3,625,531 A * | 12/1971 | Ranzenhofer | A01G 23/00 280/483 |
| 3,759,541 A | 9/1973 | Peterson | |
| 4,018,296 A * | 4/1977 | Knudson | B60G 17/005 180/41 |
| 6,502,840 B1 * | 1/2003 | Leyonhjelm | B60G 9/02 180/905 |
| 7,025,428 B2 * | 4/2006 | Gabella | B60G 17/005 280/124.17 |
| 9,045,002 B2 | 6/2015 | Wada et al. | |
| 2004/0113383 A1 * | 6/2004 | Anderson | B66F 9/07586 280/124.111 |
| 2004/0217571 A1 * | 11/2004 | Miyake | F16C 11/045 280/759 |

(Continued)

FOREIGN PATENT DOCUMENTS

DE 102011015395 A1 * 10/2012
EP 1234695 A1 * 8/2002 ............... B60G 9/02

(Continued)

*Primary Examiner* — Paul N Dickson
*Assistant Examiner* — Kurtis Nielson

(57) ABSTRACT

An axle oscillation stop for a construction machine includes a body portion defining a first aperture. The axle oscillation stop also includes a first plate that defines a first through-aperture. The axle oscillation stop further includes a second plate that defines a second through-aperture. The axle oscillation stop includes a dowel pin adapted to removably couple the body portion with a frame of the construction machine. The dowel pin is at least partially receivable within the first aperture. The axle oscillation stop also includes a first fastening device adapted to removably couple the first plate with the frame. The first fastening device is at least partially receivable within the first through-aperture. The axle oscillation stop further includes a second fastening device adapted to removably couple the second plate with the frame. The second fastening device is at least partially receivable within the second through-aperture.

20 Claims, 8 Drawing Sheets

(56) References Cited

U.S. PATENT DOCUMENTS

| | | | | |
|---|---|---|---|---|
| 2006/0131837 A1* | 6/2006 | Zanini | ................. | B62D 53/021 |
| | | | | 280/494 |
| 2010/0237578 A1* | 9/2010 | Hakoda | ................... | B60G 9/02 |
| | | | | 280/124.116 |
| 2011/0288726 A1* | 11/2011 | Mackin | ............... | B60G 17/005 |
| | | | | 280/93.5 |
| 2014/0167340 A1* | 6/2014 | Kim | ......................... | F16F 1/44 |
| | | | | 267/292 |
| 2019/0161330 A1* | 5/2019 | Stammberger | ...... | B66F 9/07559 |
| 2020/0317486 A1* | 10/2020 | Puszkiewicz | ....... | B66F 9/07559 |
| 2021/0179406 A1* | 6/2021 | Chaillou | ............... | B66F 9/0655 |

FOREIGN PATENT DOCUMENTS

| | | | | | |
|---|---|---|---|---|---|
| EP | 2444304 A1 | * | 4/2012 | ........... | B60G 17/016 |
| JP | H0648150 A | * | 2/1994 | | |
| KR | 19980021527 U | * | 7/1998 | | |
| KR | 20180079654 | | 7/2018 | | |
| WO | WO-2019197012 A1 | * | 10/2019 | | |

* cited by examiner

AXLE OSCILLATION STOP FOR CONSTRUCTION MACHINE

TECHNICAL FIELD

The present disclosure relates to a construction machine, and more particularly, to an axle oscillation stop for the construction machine.

BACKGROUND

A construction machine, such as a wheel loader, typically includes a pair of axle oscillation stops that are coupled to a rear frame of the construction machine. The axle oscillation stops may limit an oscillation of a rear axle of the construction machine. The axle oscillation stops may prevent a contact of a rear axle and/or rear wheels of the construction machine with the rear frame during the oscillation of the rear axle.

Conventionally, the axle oscillation stops are coupled to the frame by a welding process. However, when the axle oscillation stops are welded with the rear frame, a machine build configuration of the construction machine may have to be decided during a preliminary production stage. Such an approach may cause hinderances during a production of heavy structures associated with the construction machine. Moreover, if the axle oscillation stops are welded early on, an increased effort may be required to incorporate axle oscillation stops of a different dimension as per the needs of a customer.

KR20180079654 describes a rear axle oscillating angle adjusting device for a wheel loader. The rear axle oscillating angle adjusting device is capable of quickly and conveniently varying and controlling a rear axle oscillating angle limit by improving a conventional rear axle oscillating stopper, into a new structure type, provided to relieve tilting of a wheel loader by oscillating a rear wheel axle shaft according to the curvature of a road surface. The rear axle oscillating angle adjusting device comprises a stopper member fixed to a rear frame of a wheel loader; an oscillating control pin which is movably coupled to the inside of the stopper member in a manner of passing through the rear frame of the wheel loader, and adjusts an oscillating angle according to a length drawn to the lower surface of the stopper member; and a coupling fixing means which is coupled in a manner of penetrating the stopper member and the oscillating control pin.

SUMMARY OF THE DISCLOSURE

In an aspect of the present disclosure, an axle oscillation stop for a construction machine is provided. The axle oscillation stop includes a body portion defining a first aperture, a first end, and a second end opposite the first end. The axle oscillation stop also includes a first plate extending from the first end of the body portion. The first plate defines a first through-aperture. The axle oscillation stop further includes a second plate extending from the second end of the body portion. The second plate defines a second through-aperture. The axle oscillation stop includes a dowel pin adapted to removably couple the body portion with a frame of the construction machine. The dowel pin is at least partially receivable within the first aperture in the body portion. The axle oscillation stop also includes a first fastening device adapted to removably couple the first plate with the frame. The first fastening device is at least partially receivable within the first through-aperture in the first plate. The axle oscillation stop further includes a second fastening device adapted to removably couple the second plate with the frame. The second fastening device is at least partially receivable within the second through-aperture in the second plate.

In another aspect of the present disclosure, a construction machine is provided. The construction machine includes a frame. The construction machine also includes a pair of axle oscillation stops adapted to be removably coupled with the frame. Each of the pair of the axle oscillation stops includes a body portion defining a first aperture, a first end, and a second end opposite the first end. Each of the pair of the axle oscillation stops also includes a first plate extending from the first end of the body portion. The first plate defines a first through-aperture. Each of the pair of the axle oscillation stops further includes a second plate extending from the second end of the body portion. The second plate defines a second through-aperture. Each of the pair of the axle oscillation stops includes a dowel pin adapted to removably couple the body portion with the frame of the construction machine. The dowel pin is at least partially receivable within the first aperture in the body portion. Each of the pair of the axle oscillation stops also includes a first fastening device adapted to removably couple the first plate with the frame. The first fastening device is at least partially receivable within the first through-aperture in the first plate. Each of the pair of the axle oscillation stops further includes a second fastening device adapted to removably couple the second plate with the frame. The second fastening device is at least partially receivable within the second through-aperture in the second plate.

Other features and aspects of this disclosure will be apparent from the following description and the accompanying drawings.

DETAILED DESCRIPTION

Figure 1:
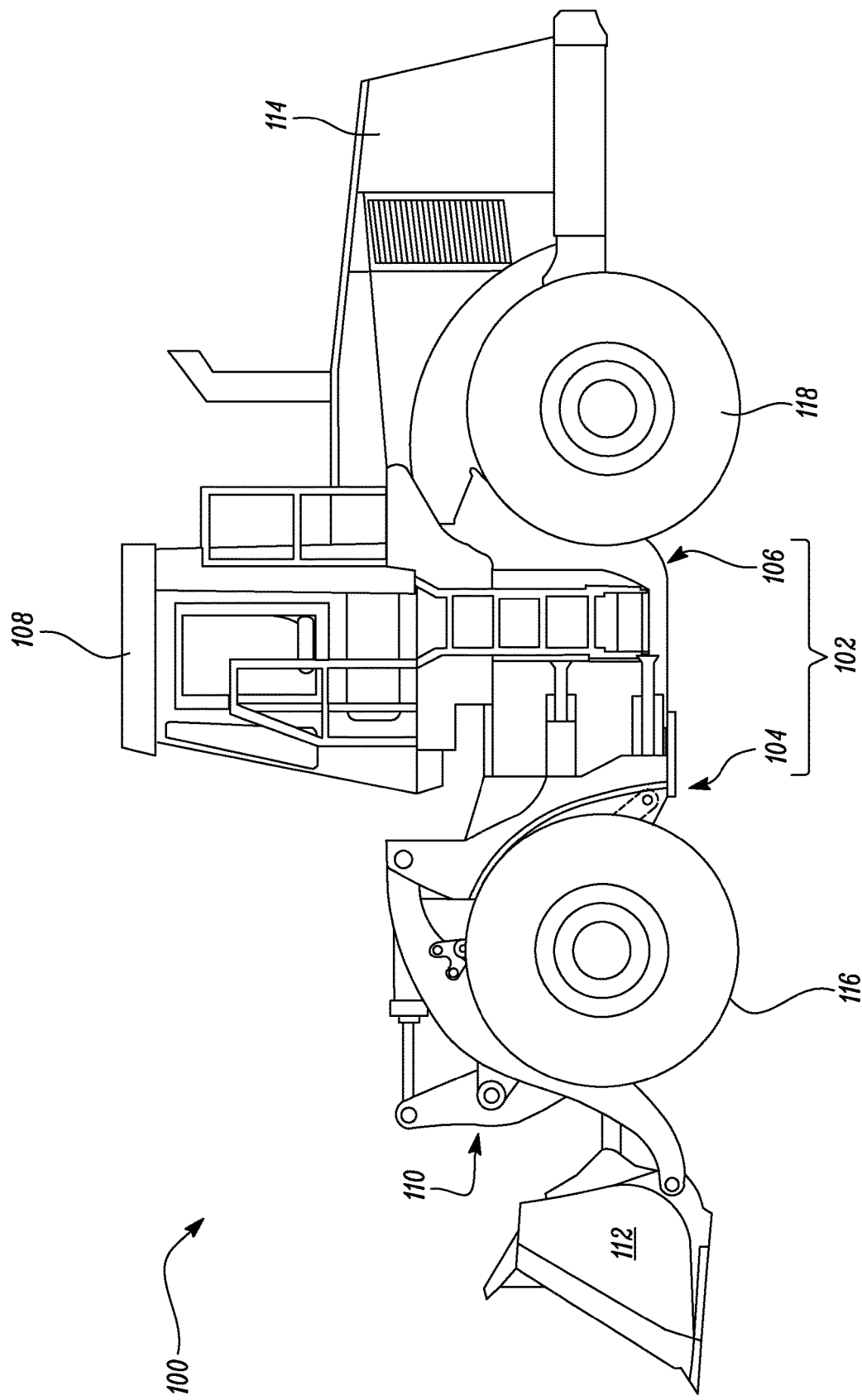
FIG. 1 is a side view of a construction machine, according to an embodiment of the present disclosure.

Wherever possible, the same reference numbers will be used throughout the drawings to refer to the same or like parts. Referring to FIG. 1, a side view of an exemplary construction machine 100 is illustrated. The construction machine 100 is embodied as a wheel loader that may be used for purposes, such as, construction, landscaping, agriculture, and the like. Alternatively, the construction machine 100 may be embodied as an off highway truck, a dozer, an excavator, a tractor, a motor grader, a scraper, etc. that may be used in various industries to move, remove, or load materials, such as, asphalt, debris, dirt, snow, feed, gravel, logs, raw minerals, recycled material, rock, sand, woodchips, etc.

The construction machine 100 includes a frame assembly 102. The frame assembly 102 supports various components of the construction machine 100 thereon. The frame assembly 102 includes a front frame 104 and a rear frame 106. The rear frame 106 may be hereinafter interchangeably referred to as the frame 106. The construction machine 100 further includes an operator cabin 108 supported by the frame assembly 102. The operator cabin 108 may include one or more controls (not shown), such as, joysticks, pedals, levers, buttons, switches, knobs, audio visual devices, operator consoles, a steering wheel, and the like. The controls may enable an operator to control the construction machine 100 during operation thereof.

The construction machine 100 also includes a linkage assembly 110 movably coupled to the front frame 104. The construction machine 100 further includes an implement 112 coupled to the front frame 104 via the linkage assembly 110. The implement 112 includes a bucket herein. Alternatively, the implement 112 may include a blade, a ripper, and the like. The implement 112 may be used to perform one or more work operations, such as loading, stock piling, dumping, and the like. The construction machine 100 also includes a hood 114 mounted on the rear frame 106. Further, the construction machine 100 includes a power source (not shown) supported by the rear frame 106. The power source may be enclosed by the hood 114. The power source may include an engine, such as, an internal combustion engine, batteries, motors, and the like. The power source may supply power to various components of the construction machine 100 for operational and mobility requirements.

The construction machine 100 further includes a pair of front wheels 116 and a pair of rear wheels 118. The front and rear wheels 116, 118 provide support and mobility to the construction machine 100 on grounds. Alternatively, the construction machine 100 may include tracks instead of the front and rear wheels 116, 118. The front wheels 116 are supported by the front frame 104. A front axle (not shown) may couple the front wheels 116 with the front frame 104.

Figure 2:
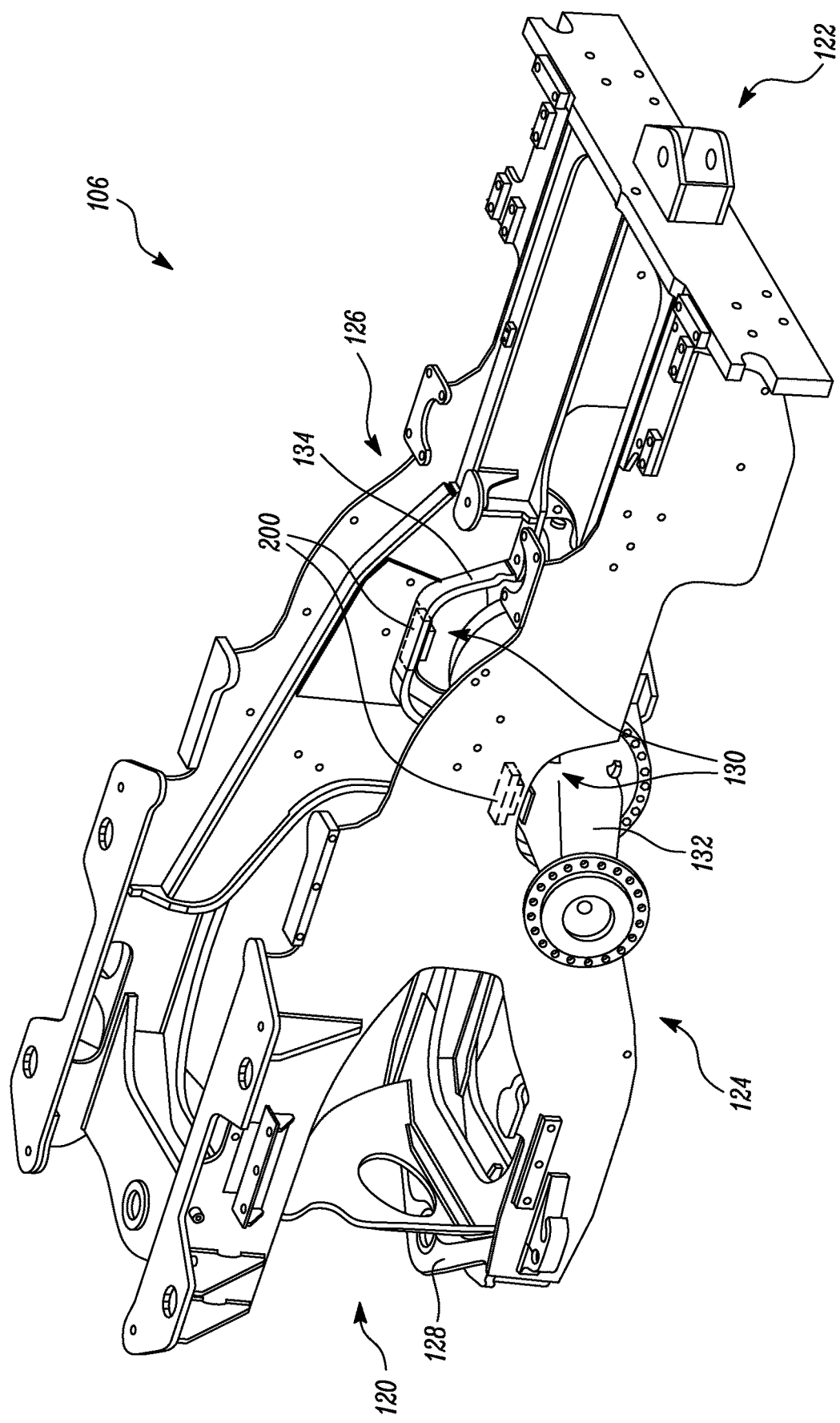
FIG. 2 is a perspective view illustrating a rear frame of the construction machine of FIG. 1.

Referring to FIG. 2, a perspective view of the rear frame 106 is illustrated. The rear frame 106 defines a front end 120 and a rear end 122. The rear frame 106 also defines a first side 124 and a second side 126. Further, the rear frame 106 includes a coupling portion 128 that is disposed proximate to the front end 120 of the rear frame 106. The coupling portion 128 may facilitate pivotal coupling of the front frame 104 (see FIG. 1) with the rear frame 106. The rear frame 106 supports the power source proximate to the rear end 122. Further, the hood 114 (see FIG. 1) may couple with the rear frame 106 proximate to the rear end 122 for enclosing the power source. As illustrated in FIG. 2, the rear frame 106 includes an axle opening 130 at each of the first and second sides 124, 126 of the rear frame 106.

The construction machine 100 further includes an axle 132. The axle 132 includes a rear axle of the construction machine 100. The axle 132 may be hereinafter interchangeably referred to as the rear axle 132. Each of the axle opening 130 may receive a portion of the axle 132. The rear wheels 118 (see FIG. 1) are coupled to the axle 132. During a movement of the construction machine 100, the rear axle 132 may oscillate relative to the rear frame 106.

The present disclosure relates to an axle oscillation stop 200 for the construction machine 100. In the illustrated embodiment of FIG. 2, the construction machine 100 includes a pair of axle oscillation stops 200 removably coupled with the frame 106. Specifically, one of the axle oscillation stops 200 is coupled with the frame 106 at the first side 124 and another axle oscillation stop 200 is coupled with the frame 106 at the second side 126.

Figure 3:
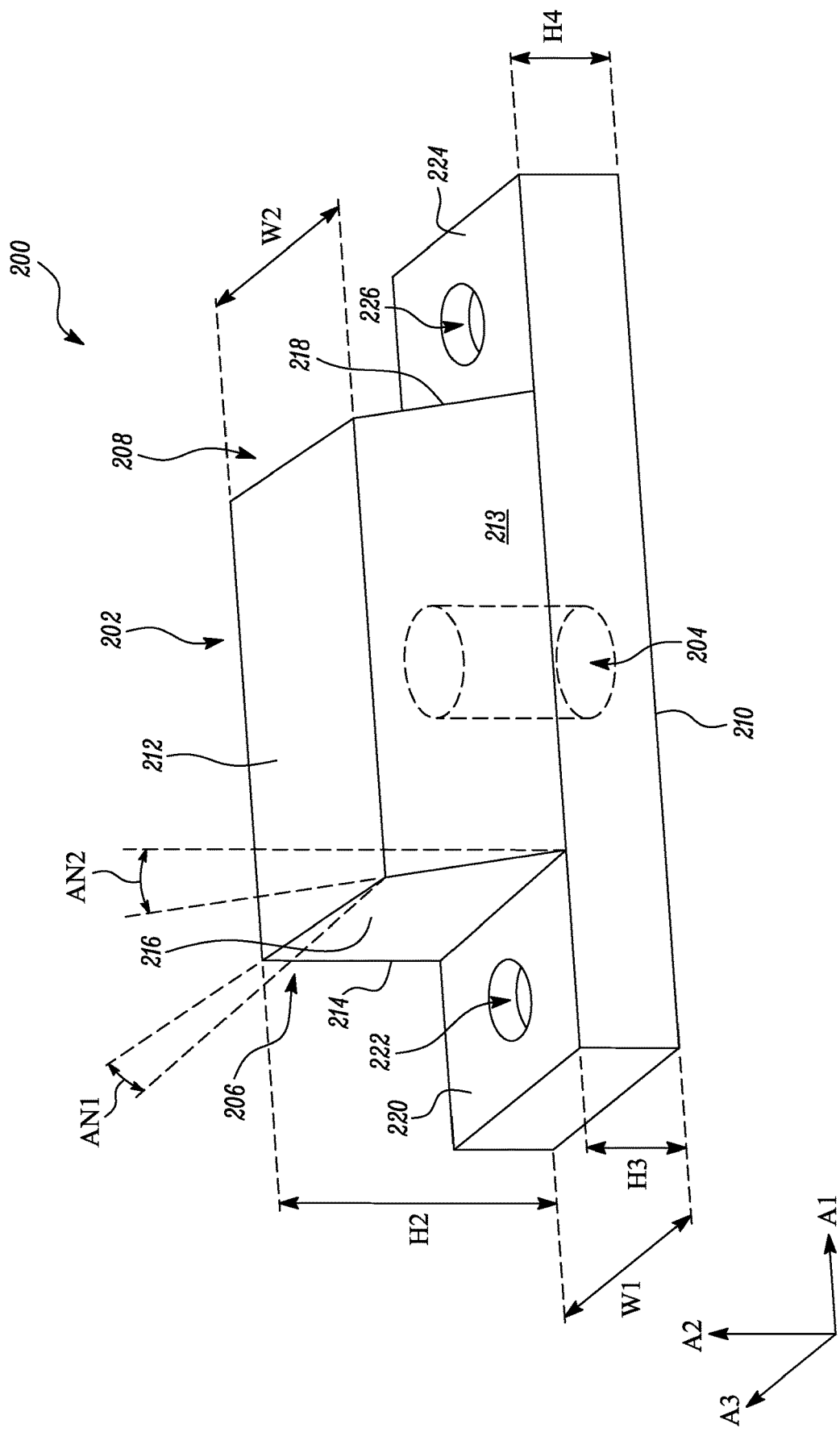
FIG. 3 is a perspective view illustrating an axle oscillation stop associated with the construction machine of FIG. 1, according to an embodiment of the present disclosure.

Referring to FIG. 3, a perspective view of the axle oscillation stop 200 is illustrated, in accordance with an embodiment of the present disclosure. The axle oscillation stop 200 defines a horizontal direction A1 and a vertical direction A2. The axle oscillation stop 200 includes a body portion 202. The body portion 202 defines a first aperture 204, a first end 206, and a second end 208 opposite the first end 206. Further, the body portion 202 defines a first height "H2". The first height "H2" corresponds to a maximum height of the body portion 202 that is defined along the vertical direction "A2". The body portion 202 further defines a first width "W1" and a second width "W2" extending along a direction "A3". The direction "A3" is perpendicular to the vertical direction "A2". Further, the first width "W1" is greater than the second width "W2".

The body portion 202 may include a generally box shaped structure. The body portion 202 defines a first surface 210 and a second surface 212 opposite the first surface 210. The first aperture 204 extends from the first surface 210 towards the second surface 212. In some examples, the first aperture 204 is embodied as a blind aperture. The first aperture 204 may extend along at least half of the first height "H2". Further, the second surface 212 may engage with the axle 132 (see FIG. 2) of the construction machine 100 (see FIG. 1) for limiting the oscillation of the axle 132. In some examples, the second surface 212 includes a beveled profile. Due to the beveled profile of the second surface 212, the first surface 210 and the second surface 212 may be inclined to each other. The beveled profile of the second surface 212 may ensure that the axle oscillation stop 200 has a surface contact with the axle 132 instead of an edge contact. The second surface 212 may be inclined relative to the first surface 210 by a first angle "AN1".

The body portion 202 further defines a first side surface 213 and a second side surface 214 opposite the first side surface 213. In some examples, the first side surface 213 and the second side surface 214 may be inclined to each other. In an example, the first side surface 213 may be inclined relative to the second side surface 214 by a second angle "AN2". The first width "W1" is greater than the second width "W2" due to the inclination of the first side surface 213 relative to the second side surface 214. Further, the body portion 202 defines a third side surface 216 extending between the first and second side surfaces 213, 214 at the first end 206 of the body portion 202. Moreover, the body portion 202 defines a fourth side surface 218 extending between the first and second side surfaces 213, 214 at the second end 208 of the body portion 202.

The axle oscillation stop 200 further includes a first plate 220 extending from the first end 206 of the body portion 202. Specifically, the first plate 220 extends from the first end 206 parallel to the horizontal direction "A1". The first plate 220 extends from the third side surface 216 and is substantially perpendicular to the third side surface 216. The first plate 220 defines a first through-aperture 222. The first plate 220 defines a second height "H3".

The axle oscillation stop 200 further includes a second plate 224 extending from the second end 208 of the body portion 202. Specifically, the second plate 224 extends from the second end 208 parallel to the horizontal direction "A1". The second plate 224 extends from the fourth side surface 218 and is substantially perpendicular to the fourth side surface 218. The second plate 224 defines a second through-aperture 226. The first and second through-apertures 222, 226 may have similar diameters. The second plate 224 defines a third height "H4". The first height "H2" is greater than the second height "H3" and the third height "H4". In an example, the first height "H2" may be greater than each of the second and third heights "H3", "H4" by a factor of at least 2, without any limitations. It should be noted that the body portion 202, the first plate 220, and the second plate 224 may be made of a metal or an alloy, such as, steel.

Figure 4:
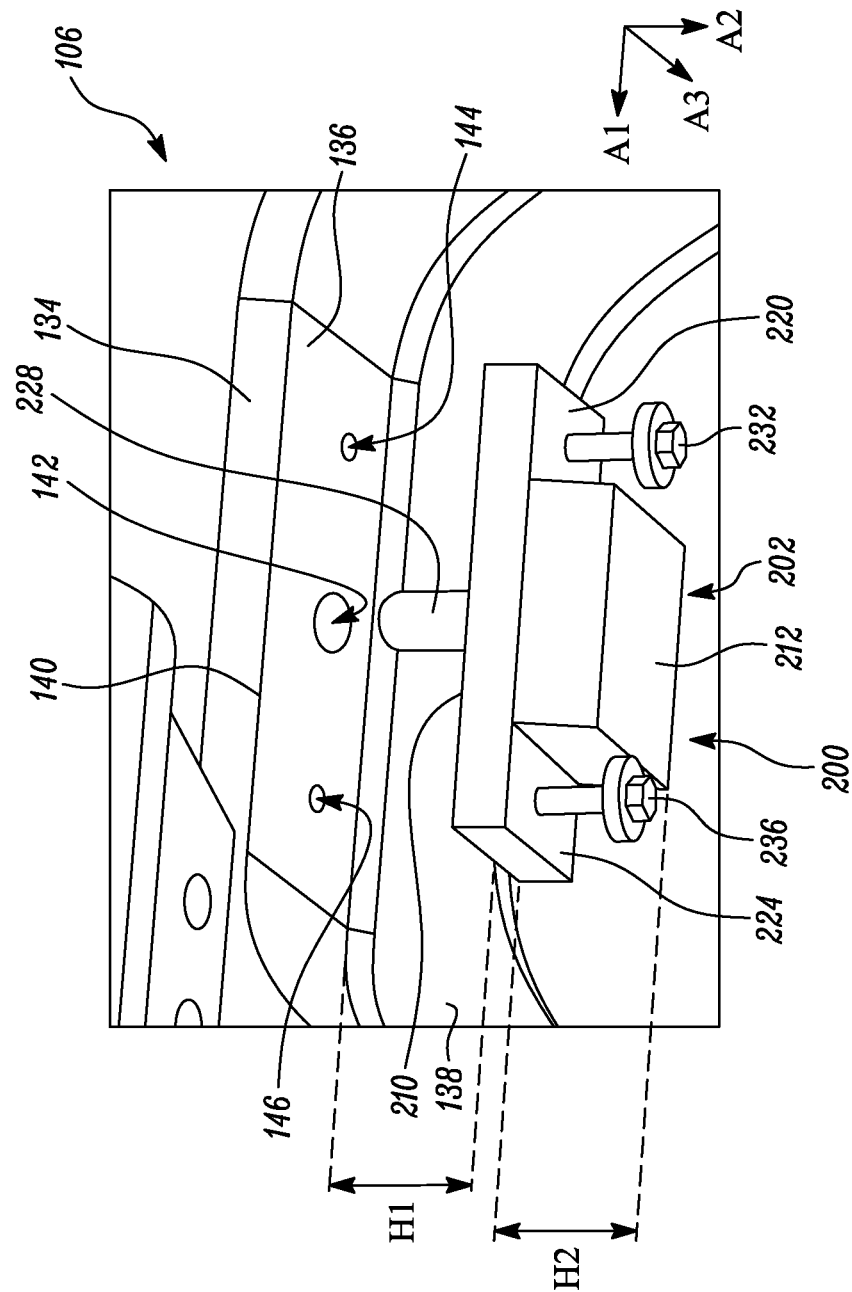
FIG. 4 is an exploded view of the axle oscillation stop of FIG. 3.

Referring to FIG. 4, a portion of the frame 106 is illustrated. The frame 106 includes a frame extension 134. The frame extension 134 defines an underside surface 136 oriented substantially in the horizontal direction "A1". The underside surface 136 defines an outer edge 140. Further, the frame extension 134 defines a frame through-aperture 142, a first frame aperture 144, and a second frame aperture 146 disposed at either sides of the frame through-aperture 142. The first and second frame apertures 144, 146 are embodied as threaded apertures herein. The frame 106 also defines an interior surface 138 extending in the vertical direction "A2". The interior surface 138 extends from the underside surface 136. Further, the interior surface 138 defines a frame height "H1" along the vertical direction "A2".

FIG. 4 also illustrates an exploded view of the axle oscillation stop 200. As illustrated in FIG. 4, the axle oscillation stop 200 includes a dowel pin 228 to removably couple the body portion 202 with the frame 106 of the construction machine 100 (see FIG. 1). The dowel pin 228 is at least partially receivable within the first aperture 204 (see FIG. 3) in the body portion 202. Further, the frame 106 defines the frame through-aperture 142, such that the frame through-aperture 142 aligns with the first aperture 204 to receive the dowel pin 228 for removably coupling the body portion 202 with the frame 106.

In some examples, the dowel pin 228 may be cooled (e.g., frozen) during installation that may cause the dowel pin 228 to shrink during installation. Such an approach may facilitate coupling of the dowel pin 228 with the frame 106 and the body portion 202 with minimal efforts. Moreover, once the dowel pin 228 is installed, due to an expansion of the dowel pin 228, the dowel pin 228 may be coupled by an interference fit with the frame 106 as well as the body portion 202 (e.g., shrink fit). Alternatively, the dowel pin 228 may be coupled by a clearance fit with the frame 106 as well as the body portion 202. In such examples, the dowel pin 228 may be more easily removable during disassembly of the axle oscillation stop 200.

The axle oscillation stop 200 further includes a first fastening device 232 to removably couple the first plate 220 with the frame 106. The first fastening device 232 is at least partially receivable within the first through-aperture 222 (see FIG. 3) in the first plate 220. Specifically, the frame 106 defines the first frame aperture 144, such that the first frame aperture 144 aligns with the first through-aperture 222 in the second plate 224 to receive the second fastening device 236 for removably coupling the second plate 224 with the frame 106.

Further, the axle oscillation stop 200 includes a second fastening device 236 to removably couple the second plate 224 with the frame 106. The second fastening device 236 is at least partially receivable within the second through-aperture 226 (see FIG. 3) in the second plate 224. Specifically, the frame 106 defines a second frame aperture 146, such that the second frame aperture 146 aligns with the second through-aperture 226 in the second plate 224 to receive the second fastening device 236 for removably coupling the second plate 224 with the frame 106.

In some examples, each of the first fastening device 232 and the second fastening device 236 may include a bolt and nut arrangement. In other examples, each of the first fastening device 232 and the second fastening device 236 may include any other type of mechanical fastener, for example, screws, pins, and the like. Further, the first and second fastening devices 232, 236 may be similar in dimensions.

Figure 5:
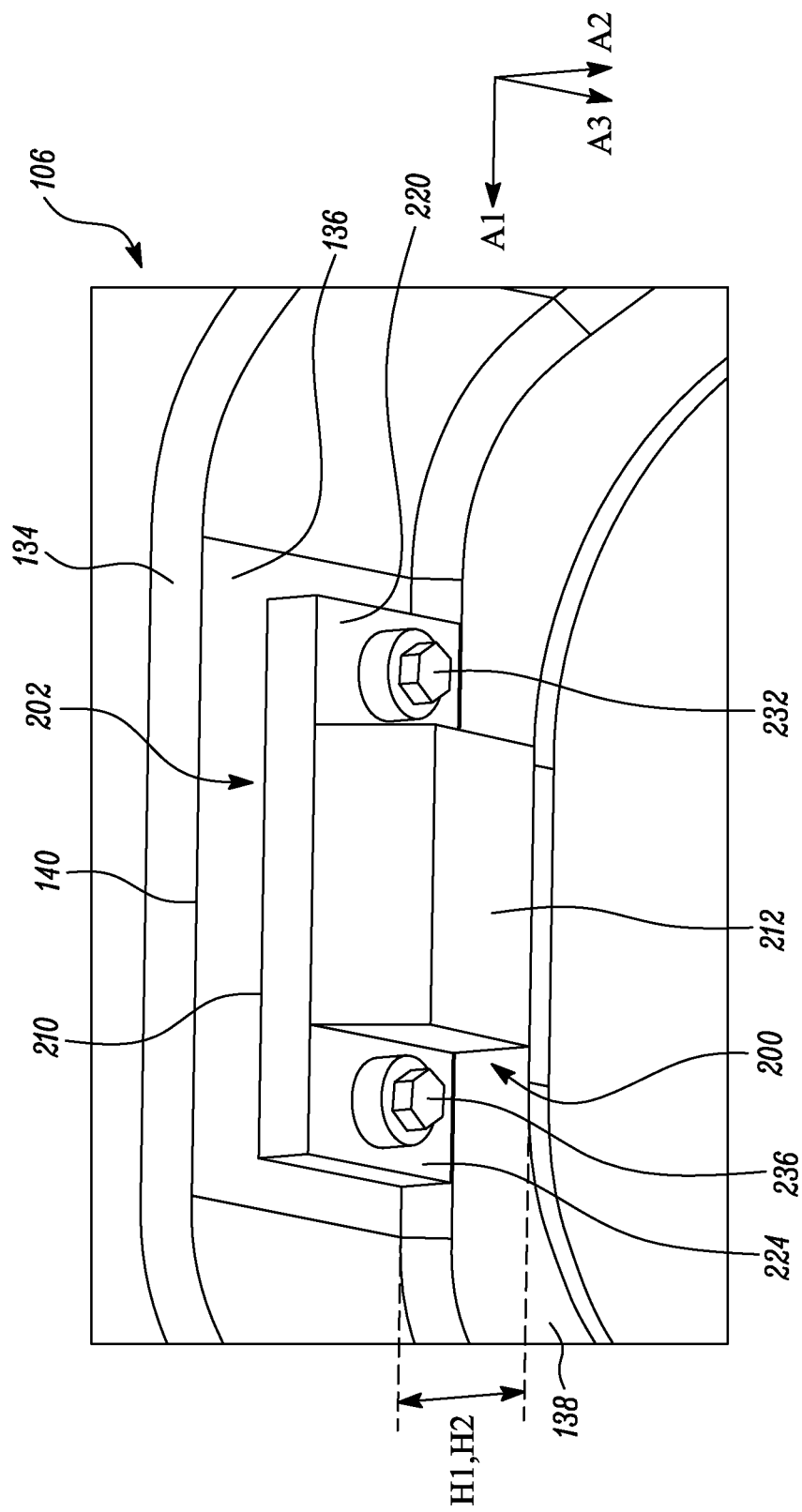
FIG. 5 is a side perspective view illustrating the axle oscillation stop coupled with the rear frame of FIG. 2.

FIG. 5 illustrates the axle oscillation stop 200 coupled to the frame 106. When the axle oscillation stop 200 is coupled to the frame 106, the first surface 210 contacts the underside surface 136 of the frame 106. Further, when the axle oscillation stop 200 is coupled to the frame 106, the second surface 212 fits inside the frame 106. More particularly, the first height "H2" may be equal to or less than the frame height "H1". In the illustrated example of FIG. 5, the first height "H2" is substantially equal to the frame height "H1". However, in other examples, the first height "H2" may be less than the frame height "H1".

Figure 6:
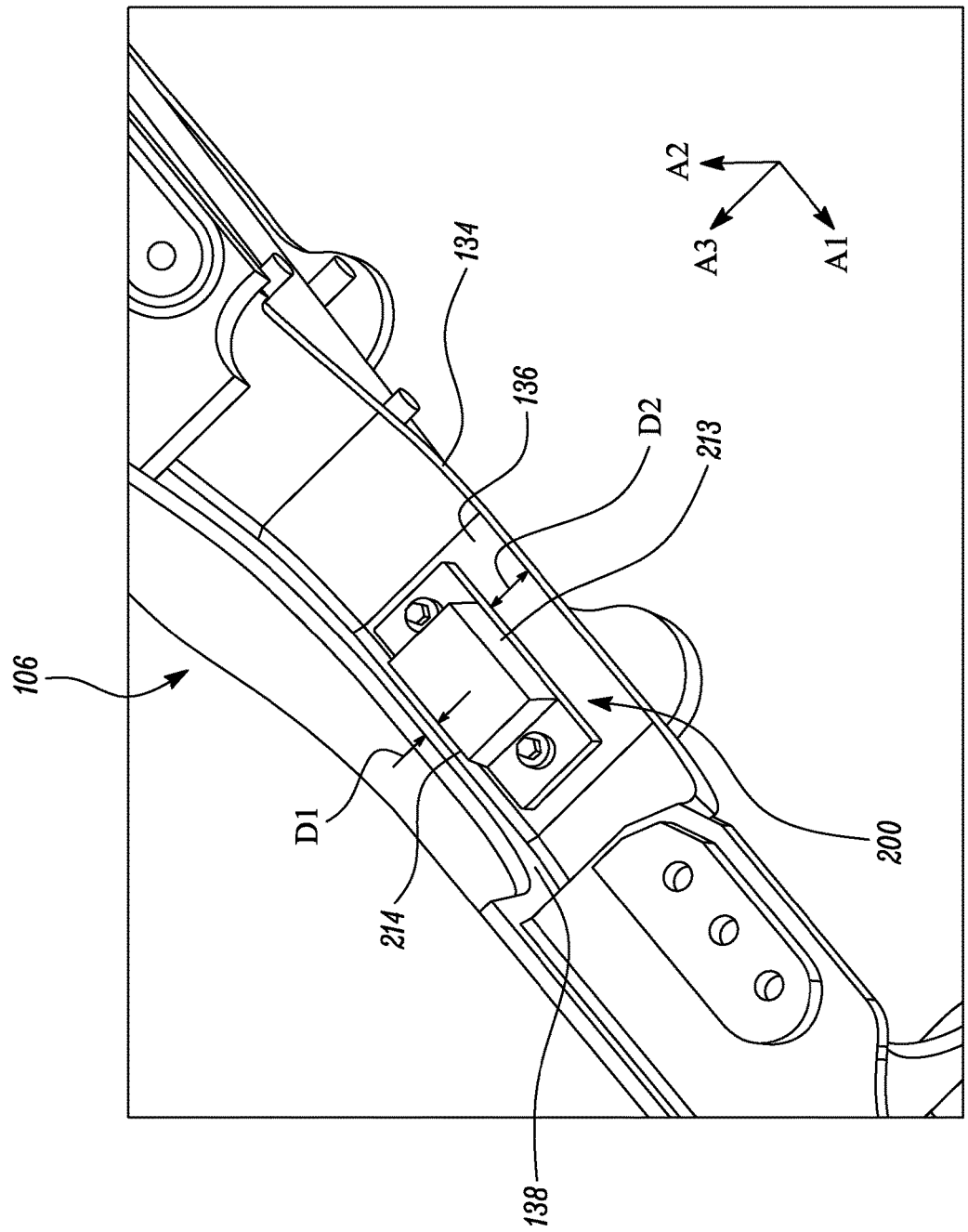
FIG. 6 is a bottom perspective view illustrating the axle oscillation stop coupled with the rear frame of FIG. 2.

Referring now to FIG. 6, a bottom perspective view of a portion of the frame 106 is illustrated. As illustrated in FIG. 6, the axle oscillation stop 200 is coupled with the frame 106 at the frame extension 134. The axle oscillation stop 200 is coupled with the frame 106 such that a first distance "D1" is defined between the interior surface 138 and the second side surface 214 of the body portion 202. Further, a second distance "D2" may be defined between the first side surface 213 of the body portion 202 and the outer edge 140 of the frame extension 134. The first and second distances "D1", "D2" are defined along the direction "A3". In the illustrated example of FIG. 6, the second distance "D2" is greater than the first distance "D1". Alternatively, the axle oscillation stop 200 may be coupled to the underside surface 136 such that the first distance "D1" is substantially equal to the second distance "D2". In yet another example, the axle oscillation stop 200 may be coupled to the interior surface 138 as well as the underside surface 136 such that the first distance "D1" is substantially equal to 0. In such an embodiment, shear loads may be transferred through direct contact, thereby eliminating a need of dowel pins.

Figure 7:
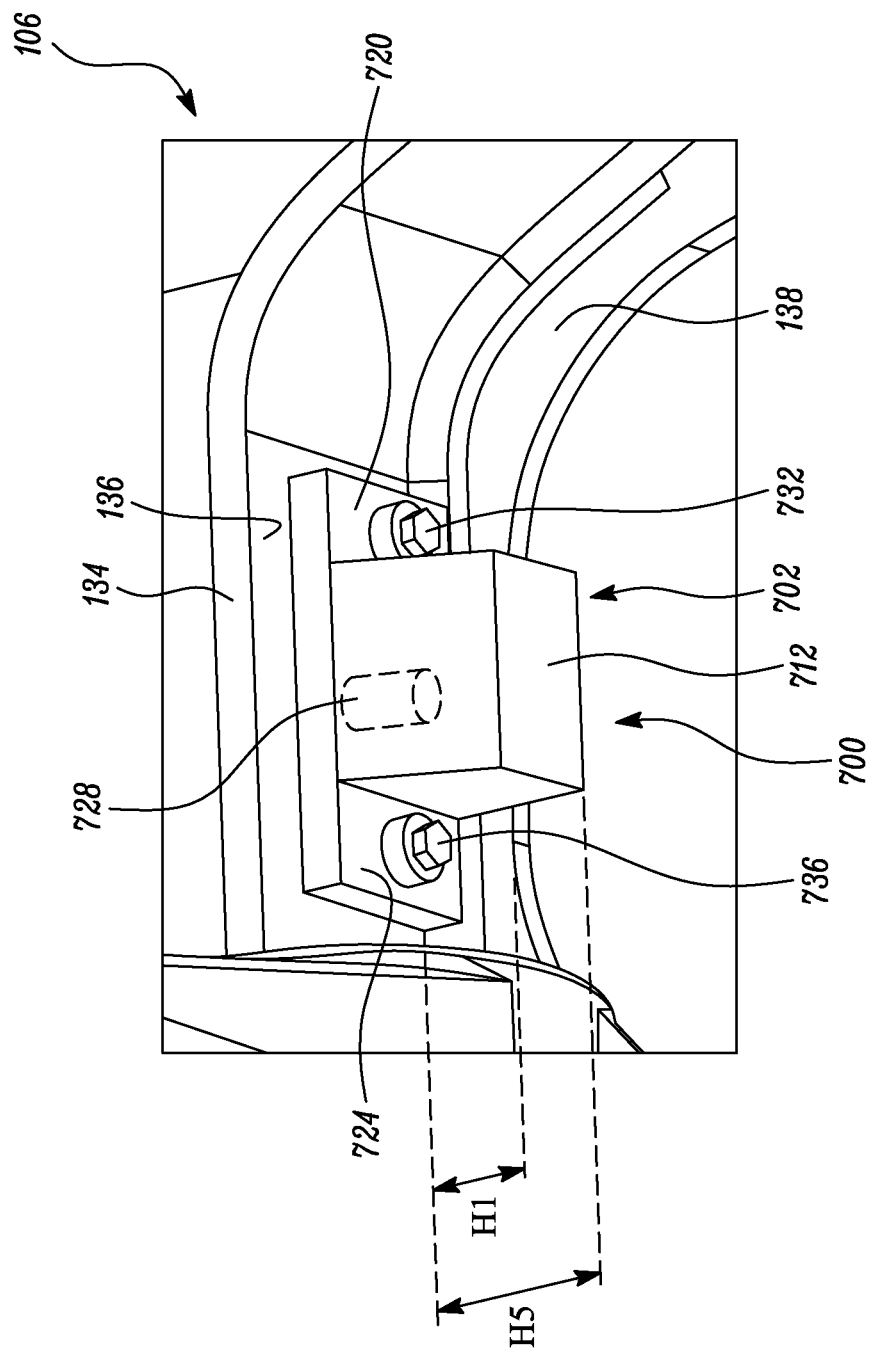
FIG. 7 is a side perspective view illustrating an axle oscillation stop associated with the construction machine of FIG. 1, according to another embodiment of the present disclosure.

Referring to FIG. 7, a perspective view of an axle oscillation stop 700 removably coupled with the frame 106 is illustrated, in accordance with another embodiment of the present disclosure. The axle oscillation stop 700 may be substantially similar to the axle oscillation stop 200 (see FIGS. 3-5) in terms of design and functionality. The axle oscillation stop 700 includes a body portion 702 defining a first height "H5". The body portion 702 may be substantially similar to the body portion 202 (see FIG. 3), however, the first height "H5" of the body portion 702 is greater than the frame height "H1". Moreover, the first height "H5" of the body portion 702 is greater than the first height "H2" of the body portion 202. In some examples, a value of the first height "H5" may be twice a value of the first height "H2", without any limitations. The first height "H5" is embodied as a maximum height of the body portion 702 that is defined between a first surface 710 and a second surface 712 of the body portion 702.

Further, the second surface 712 includes a beveled profile. Moreover, the second surface 712 extends outside the frame 106. Specifically, as the first height "H5" is greater than the frame height "H1", a portion of the body portion 702 that includes the second surface 712 extends outside the frame 106. Further, the body portion 702 is coupled with the frame 106 by a dowel pin 728. Moreover, the axle oscillation stop 700 includes a first plate 720 and a second plate 724 that may be substantially similar to the respective first and second plates 220, 224 (see FIG. 3). The first and second plates 720, 724 are coupled with the frame 106 by a first fastening device 732 and a second fastening device 736, respectively.

Figure 8:
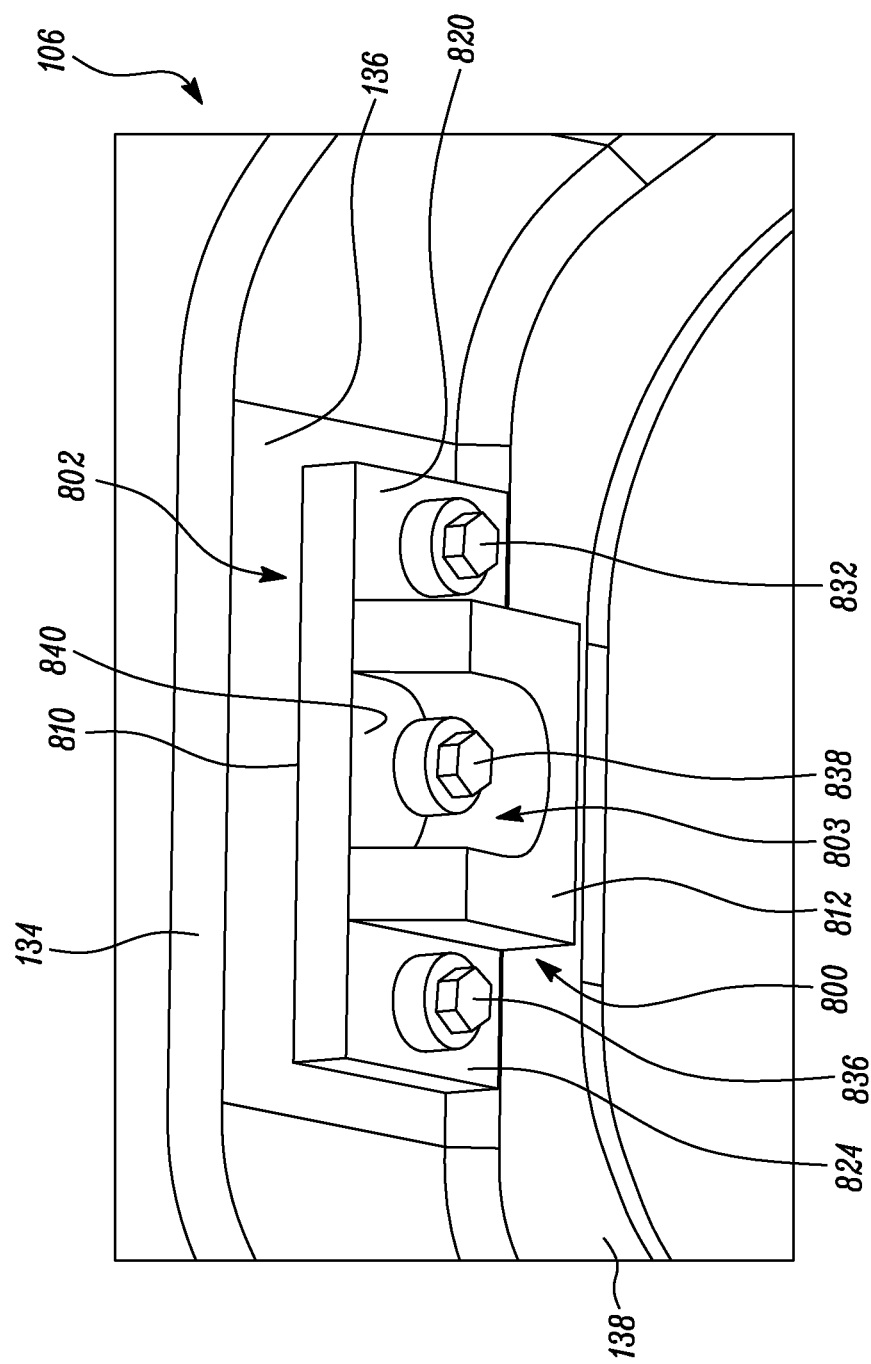
FIG. 8 is a side perspective view illustrating an axle oscillation stop associated with the construction machine of FIG. 1, according to yet another embodiment of the present disclosure.

Referring to FIG. 8, a perspective view of an axle oscillation stop 800 is illustrated, in accordance with yet another embodiment of the present disclosure. The axle oscillation stop 800 may be substantially similar to the axle oscillation stop 200 (see FIGS. 3-5) in terms of design and functionality.

The axle oscillation stop 800 includes a body portion 802. The body portion 802 may be substantially similar to the body portion 202 (see FIG. 3) except that the body portion 802 defines a cavity 803. The body portion 802 includes a first surface 810 and a second surface 812. The first and second surface 810, 812 may be substantially similar to the first and second surface 210, 212 of the body portion 202 as explained in relation to FIG. 3. Further, the second surface 812 includes a beveled profile. Moreover, the second surface 812 fits inside the frame 106.

The body portion 802 further defines a first aperture (not shown). In the illustrated example, the first aperture is a through aperture extending from a surface 840 defined by the body portion 802 to the first surface 810. Further, the axle oscillation stop 800 includes a third fastening device 838 that facilitates coupling of the axle oscillation stop 800 with the frame 106. The third fastening device 838 is at least partially receivable within the first aperture in the body portion 802 for coupling the body portion 802 with the frame 106.

Moreover, the axle oscillation stop 800 includes a first plate 820 and a second plate 824 that may be substantially similar to the respective first and second plates 220, 224 (see FIG. 3). The first and second plates 820, 824 are coupled with the frame 106 by a first fastening device 832 and a second fastening device 836, respectively. The first, second, and third fastening devices 832, 836, 838 include a bolt and nut arrangement herein. However, in other examples, the first, second, and third fastening devices 832, 836, 838 may include any other type of mechanical fastener, for example, screws, pins, and the like. Further, the first, second, and third fastening devices 832, 836, 838 may be similar in dimensions.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The axle oscillation stops 200, 700, 800 described herein may be removably coupled with the frame 106 of the construction machine 100. Further, during the oscillation of the axle 132, the axle oscillation stops 200, 700, 800 may engage with the axle 132 for limiting the oscillation of the axle 132. The axle oscillation stops 200, 700, 800 as described herein may be easy to couple with the frame 106. Further, the axle oscillation stops 200, 700, 800 may be easily removable from the frame 106. Thus, a replacement process of the axle oscillation stops 200, 700, 800 may be time efficient and cost efficient.

As the axle oscillation stops 200, 700, 800 are coupled with the frame 106 by a bolted joint instead of a welded joint, the axle oscillation stops 200, 700, 800 may be coupled with the frame 106 at later stages of production. Further, as the axle oscillation stops 200, 700, 800 are coupled by the bolted joint, a machine build configuration of the construction machine 100 may be decided at later stages of production and any hinderances during production of heavy structures of the construction machine 100 may be reduced.

The axle oscillation stops 200, 700 are coupled with the frame 106 using the dowel pin 228, 728, the first fastening device 232, 732 and the second fastening device 236, 736. The dowel pins 228, 728 may withstand shear loads experienced by the axle oscillation stops 200, 700, whereas the first fastening device 232, 732 and the second fastening device 236, 736 may facilitate clamping of the axle oscillation stops 200, 700 with the frame 106. Specifically, the shear loads being experienced by the axle oscillation stops 200, 700 may be directly transferred to the frame 106 via the dowel pin 228, 728 without using a bolted joint-load path defined by the first fastening device 232, 732 and the second fastening device 236, 736. Further, the first height "H1", "H5" of the body portion 202, 702 may be varied based on application requirements. Moreover, the axle oscillation stop 800 is coupled with the frame 106 using the first fastening device 832, the second fastening device 836, and the third fastening device 838.

Moreover, the axle oscillation stops 200, 700, 800 described herein may be directly coupled to the underside surface 136 of the frame 106. Such a technique may ensure that the shear loads being experienced by the axle oscillation stops 200, 700, 800 may be directly transferred to the frame 106 without using the bolted joint-load path. Accordingly, the connection of the axle oscillation stops 200, 700, 800 directly to the underside surface 136 may reduce stresses experienced by the respective fastening devices 232, 236, 732, 736, 832, 836, 838, which may improve a service life of the respective fastening devices 232, 236, 732, 736, 832, 836, 838 and the axle oscillation stops 200, 700, 800.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. An axle oscillation stop for a construction machine, the axle oscillation stop comprising:
   a body portion defining a first aperture, a first end, and a second end opposite the first end;
   a first plate extending from the first end of the body portion, the first plate defining a first through-aperture;
   a second plate extending from the second end of the body portion, the second plate defining a second through-aperture;
   a dowel pin adapted to removably couple the body portion with a frame of the construction machine, wherein the dowel pin is at least partially receivable within the first aperture in the body portion;

a first fastening device adapted to removably couple the first plate with the frame, wherein the first fastening device is at least partially receivable within the first through-aperture in the first plate; and a second fastening device adapted to removably couple the second plate with the frame, wherein the second fastening device is at least partially receivable within the second through-aperture in the second plate.

2. The axle oscillation stop of claim 1, wherein the frame defines a frame through-aperture, such that the frame through-aperture aligns with the first aperture to receive the dowel pin for removably coupling the body portion with the frame.

3. The axle oscillation stop of claim 1, wherein the frame defines a first frame aperture, such that the first frame aperture aligns with the first through-aperture in the first plate to receive the first fastening device for removably coupling the first plate with the frame.

4. The axle oscillation stop of claim 1, wherein the frame defines a second frame aperture, such that the second frame aperture aligns with the second through-aperture in the second plate to receive the second fastening device for removably coupling the second plate with the frame.

5. The axle oscillation stop of claim 1, wherein the body portion defines a first surface and a second surface opposite the first surface, and wherein the first aperture extends from the first surface towards the second surface.

6. The axle oscillation stop of claim 5, wherein the second surface includes a beveled profile.

7. The axle oscillation stop of claim 5, wherein the second surface is adapted to engage with an axle of the construction machine for limiting an oscillation of the axle.

8. The axle oscillation stop of claim 7, wherein the axle includes a rear axle of the construction machine.

9. The axle oscillation stop of claim 1, wherein each of the first fastening device and the second fastening device includes a bolt and nut arrangement.

10. The axle oscillation stop of claim 1, wherein the body portion defines a first height, the first plate defines a second height, and the second plate defines a third height, such that the first height is greater than the second height and the third height.

11. A construction machine comprising:
a frame; and
a pair of axle oscillation stops adapted to be removably coupled with the frame, each of the pair of the axle oscillation stops including:
a body portion defining a first aperture, a first end, and a second end opposite the first end;
a first plate extending from the first end of the body portion, the first plate defining a first through-aperture;

a second plate extending from the second end of the body portion, the second plate defining a second through-aperture;

a dowel pin adapted to removably couple the body portion with the frame of the construction machine, wherein the dowel pin is at least partially receivable within the first aperture in the body portion;

a first fastening device adapted to removably couple the first plate with the frame, wherein the first fastening device is at least partially receivable within the first through-aperture in the first plate; and a second fastening device adapted to removably couple the second plate with the frame, wherein the second fastening device is at least partially receivable within the second through-aperture in the second plate.

12. The construction machine of claim 11, wherein the frame defines a frame through-aperture, such that the frame through-aperture aligns with the first aperture to receive the dowel pin for removably coupling the body portion with the frame.

13. The construction machine of claim 11, wherein the frame defines a first frame aperture, such that the first frame aperture aligns with the first through-aperture in the first plate to receive the first fastening device for removably coupling the first plate with the frame.

14. The construction machine of claim 11, wherein the frame defines a second frame aperture, such that the second frame aperture aligns with the second through-aperture in the second plate to receive the second fastening device for removably coupling the second plate with the frame.

15. The construction machine of claim 11, wherein the body portion defines a first surface and a second surface opposite the first surface, and wherein the first aperture extends from the first surface towards the second surface.

16. The construction machine of claim 15, wherein the second surface includes a beveled profile.

17. The construction machine of claim 15 further comprising an axle, wherein the second surface is adapted to engage with the axle of the construction machine for limiting an oscillation of the axle.

18. The construction machine of claim 15, wherein the second surface fits inside the frame.

19. The construction machine of claim 15, wherein the second surface extends outside the frame.

20. The construction machine of claim 15, wherein the first surface contacts an underside surface of the frame, the underside surface being oriented substantially in a horizontal direction.

* * * * *